United States Patent
Derleth et al.

(10) Patent No.: US 7,029,389 B2
(45) Date of Patent: Apr. 18, 2006

(54) AIR SUPPLY ORIFICE OR VENT ARRANGEMENT FOR A VEHICLE

(75) Inventors: Martin Derleth, Schonungen (DE); Thomas Feith, Korntal-Münchingen (DE); Andreas Grieb, Stuttgart (DE); Walter Wolf, Oppenweiler-Zell (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/900,407

(22) Filed: Jul. 28, 2004

(65) Prior Publication Data
US 2005/0090194 A1 Apr. 28, 2005

(30) Foreign Application Priority Data
Jul. 28, 2003 (DE) ................................. 103 34 569

(51) Int. Cl.
*B60H 1/34* (2006.01)
(52) U.S. Cl. ........................ 454/152; 454/154; 454/155
(58) Field of Classification Search ................ 454/152, 454/154, 155
See application file for complete search history.

(56) References Cited

U.S. PATENT DOCUMENTS

| | | | | |
|---|---|---|---|---|
| 3,456,572 A | * | 7/1969 | Phaneuf et al. | 454/155 |
| 3,709,139 A | * | 1/1973 | Behles | 454/152 |
| 3,856,103 A | * | 12/1974 | Scholz et al. | 180/90 |
| 3,861,281 A | * | 1/1975 | Godwin | 454/155 |
| 3,921,507 A | * | 11/1975 | Condet et al. | 454/155 |

FOREIGN PATENT DOCUMENTS

| | | |
|---|---|---|
| DE | 43 24 020 C1 | 10/1994 |
| DE | 198 07 292 A1 | 9/1998 |
| DE | 199 47 208 A1 | 5/2001 |

* cited by examiner

*Primary Examiner*—Derek S. Boles
(74) *Attorney, Agent, or Firm*—Foley & Lardner LLP

(57) ABSTRACT

An air supply orifice arrangement (1) particularly suitable for a motor vehicle includes at least one air supply orifice (4) which is arranged on a support (3), wherein the air supply orifice (4) is capable of being displaced with respect to the support (3) in the event of a crash.

21 Claims, 10 Drawing Sheets

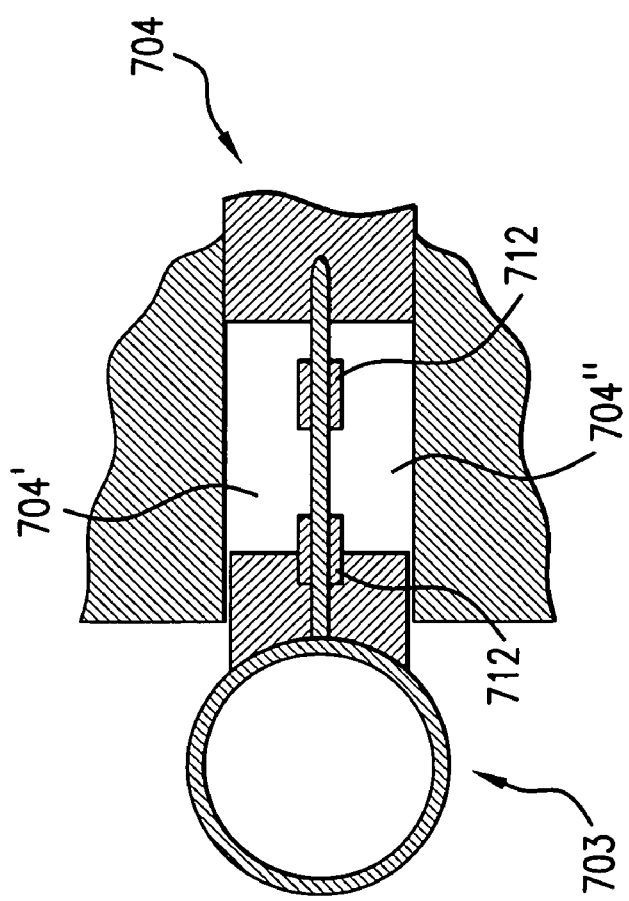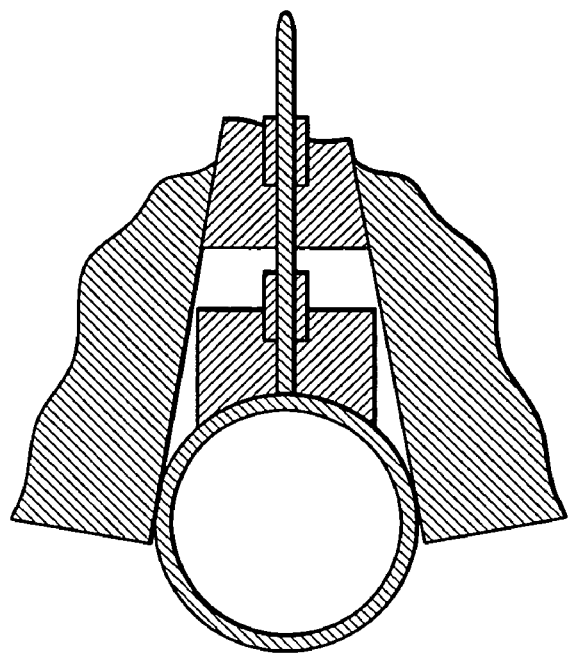
FIG.8A
FIG.8B

AIR SUPPLY ORIFICE OR VENT ARRANGEMENT FOR A VEHICLE

CROSS-REFERENCE TO RELATED PATENT APPLICATIONS

The right of priority under 35 U.S.C. §119(a) is claimed based on Federal Republic of Germany Priority Application 103 34 569.8, filed Jul. 28, 2003, the entire disclosure of which, including the specification, drawings, claims and abstract, is hereby incorporated by reference.

BACKGROUND OF THE INVENTION

The invention relates to a air supply orifice or vent arrangement designed for use in a vehicle, in particular in a motor vehicle.

The side air supply orifices and center air supply orifice in motor vehicles are generally permanently attached to a support or some other rigid component, for example, an instrument panel or dashboard, and are frequently in the impact region of the head of the driver or front seat passenger in the event of a crash. The air supply orifice is usually plugged into the air duct which is formed in the support, for which reason the air duct widens in the plug-in region. The center air supply orifice is particularly critical here, since, owing to the highly shortened installation space between the air-conditioning system and the dashboard, there is typically a block-like configuration of the air supply orifice arrangement, for structural reasons.

According to one known design, the air supply orifice is plugged from the outside onto the air duct which is formed as part of the support, and the air supply orifice bears directly against the support. In the event of a crash, significant head injuries may arise with the known air supply orifice arrangements.

SUMMARY OF THE INVENTION

One object of the invention is to make available an improved air supply orifice arrangement in a vehicle.

Another object of the invention is to provide an improved vehicle having a safer passenger compartment insofar as the design of the air supply orifices is concerned.

In accordance with one aspect of the present invention, there has been provided an air supply orifice arrangement for supplying air into a vehicle compartment of a motor vehicle, comprising: at least one air supply orifice which is adapted to be mounted on a supporting structure associated with the vehicle and which defines an air outlet opening circumference that terminates at the vehicle compartment; and a mechanism associated at least in part with said air supply orifice for mounting the air supply orifice on the supporting structure in such a manner that the air supply orifice, including said air outlet opening circumference, can be displaced with respect to the supporting structure in response to a forward impact on the air supply orifice.

In accordance with another aspect of the invention, there has been provided a motor vehicle comprising a vehicle compartment and an air-conditioning system supplying conditioned air to the compartment via at least one air supply duct, wherein the air supply duct includes at least one air supply orifice as defined above.

Further objects, features and advantages of the present invention will become apparent from the detailed description of preferred embodiments that follows, when considered together with the accompanying figures of drawing.

BRIEF DESCRIPTION OF THE DRAWINGS

The invention is explained below in detail by means of exemplary preferred embodiments and with reference to the drawings, in which:

FIGS. 8A and 8B are cross-sectional views taken through an eighth exemplary embodiment, illustrated in simplified form, with FIG. 8A showing the normal position of the air supply orifice and FIG. 8B showing the position of the air supply orifice after a crash;

DETAILED DESCRIPTION OF THE PREFERRED EMBODIMENTS

Figure 1:
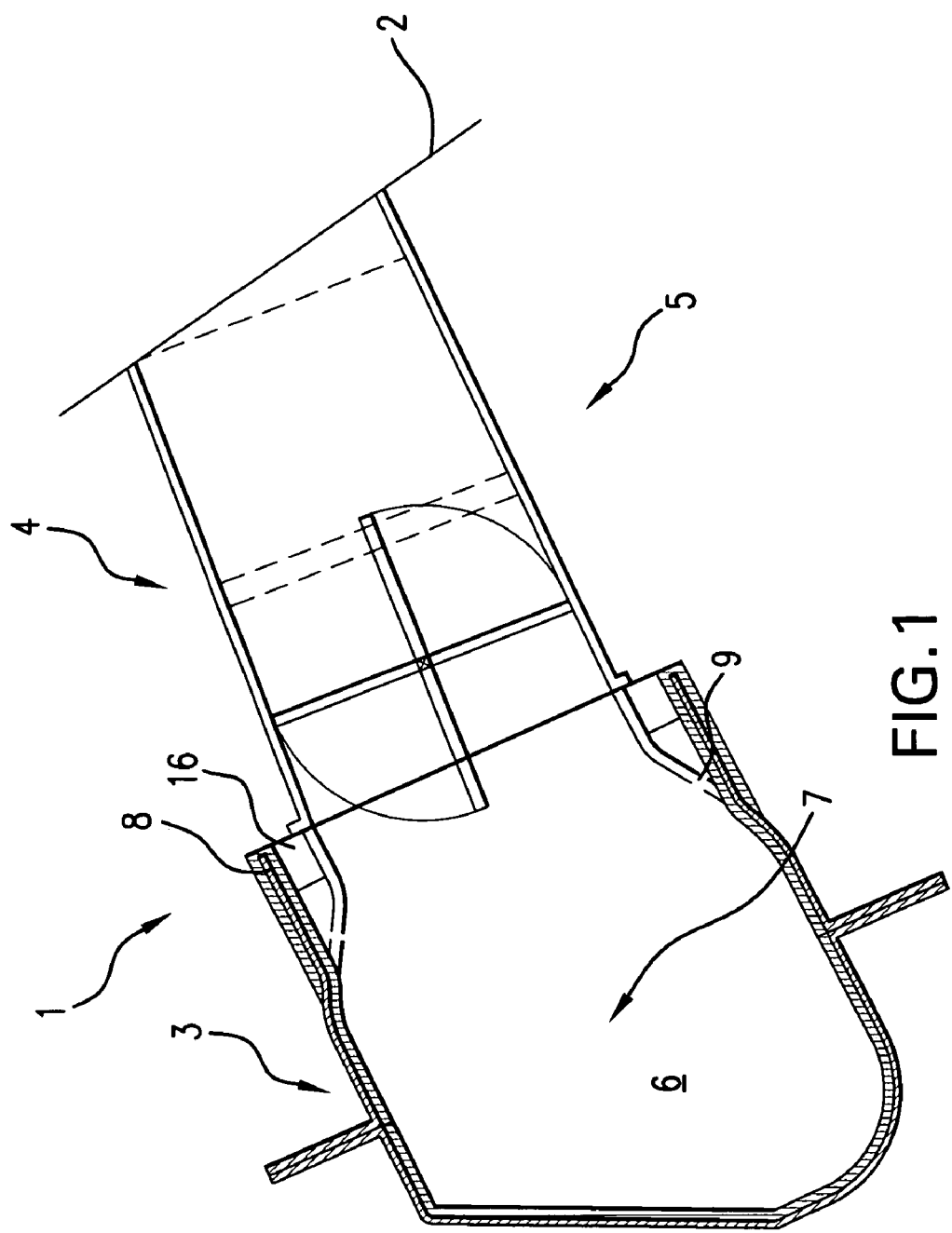
FIG. 1 is a cross-sectional view taken through an air supply orifice arrangement according to a first exemplary embodiment which is illustrated in simplified form.

According to the invention, an air supply orifice arrangement is provided in which the air supply orifice, or at least the front part thereof, can be displaced in the direction of the support when necessary, i.e. in the event of a crash or other event in which an object or a head strikes it, in which there occurs an inward deformation of the dashboard, in or on which the air supply orifice is arranged. According to the present invention, the term "support" is to be understood in a broad sense, intended to mean other parts to which an air supply orifice is fitted.

As a result of the configuration of the air supply orifice arrangement according to the invention, a certain deformation distance for the air supply orifice with respect to the support is provided owing to the displaceability of the former, so that in the event of a crash the air supply orifice does not project into the vehicle compartment as a rigid protrusion when the adjacent region of the dashboard is deformed inwardly. The deformation distances of the surface of the dashboard in the event of a head impact when there is a crash are usually between 30 and 100 mm, and thus the external region of the air supply orifice should be able to retract a corresponding distance in the event of a crash. In this way, injuries owing to the air supply orifice can be reliably avoided and the head can impact over the largest area possible with minimum injury.

The air supply orifice in one embodiment is preferably capable of being at least partially pushed into the support, for which reason the air supply orifice is plugged into an opening in the support. At the same time, the connection between the support and air supply orifice which ensures the displaceability when necessary can preferably be formed by a sliding seat formed by an elastomeric member.

In another embodiment, the air supply orifice can be plugged onto (fitted over) the support, in which case predetermined break points are preferably provided on the air supply orifice, and these permit the air supply orifice to slide at least partially onto the support in a crash. One or more predetermined break points are preferably provided transversely with respect to the longitudinal direction of the air supply orifice between a vent part and an air guide part in which, for example, louvers are arranged so that in the event of a crash the air supply orifice splits. A cross-sectional widening or a cross-sectional restriction between the vent part and the air guide part is preferably provided here. Alternatively, in the case of an air supply orifice which is plugged onto the support, it is also possible to provide a division in the longitudinal direction of the air supply orifice, so that the air supply orifice splits in the event of a crash and slides over the support.

An elastic connection can be provided between the support and the air supply orifice, which permits the relative movement with respect to the support in the event of a crash. Alternatively, instead of an elastic connection, a predetermined break point may be provided which fulfils the same function. It is also possible, in principle, to combine the elastic connection and predetermined break point(s), or to combine any of the other features according to the invention that enable the air supply orifice to be relatively displaced with respect to the support.

In another embodiment, the air supply orifice is preferably embodied in a plurality of parts, with the connection between the individual parts of the air supply orifice being released in the event of a crash. It is preferable to provide clip connections or frictionally locking connections, but any other desired connections which are released when a predefined force is applied may also be provided.

The air supply orifice arrangement preferably forms an air duct with an essentially constant cross section or at most with small changes in cross section, when viewed in the direction of flow of the air. The junction between the air supply orifice and the support is preferably configured in such a way that there are no edges present in terms of fluid dynamics.

According to one preferred embodiment, part of the air supply orifice is a region or part which is formed by a film or other thin gauge material which can be compressed, e.g., preferably in the manner of a corrugation or bellows. This permits the surfaces of the dashboard and of the air supply orifice (in particular the grille) to be virtually completely conformed in the case of a deformation.

In order to ensure optimum safety, rigid components are arranged only outside of the deformation distance of the air supply orifice arrangement.

Turning now to the drawings, an inventive air supply orifice arrangement 1 which is associated with a venting system is mounted in a motor vehicle in a dashboard 2 which is indicated only schematically in FIG. 1. Here, only one side air supply orifice is illustrated. The center air supply orifice and the other side air supply orifice are preferably of corresponding design. The air supply orifice arrangement 1 has a support 3 which is formed from a correspondingly reshaped piece of sheet metal, and an air supply orifice 4 which is plugged into the support 3. Here, the support 3 is illustrated only in the region of its air outlet opening in FIG. 1.

The air supply orifice 4 in this embodiment comprises a single part, with a schematically indicated vent and louvers which form an air guide device 5. The louvers are arranged in the interior of the air supply orifice and are used to control the air which is fed to the passenger compartment of the vehicle. Any desired configuration of may be used as long as its movement mechanism or movement electrical system is embodied in such a way that it does not impede displacement of the air supply orifice 4 with respect to the support 3. A preferably elastomeric ring 16 forms a sliding seat and ensures a displaceable connection between the support 3 and air supply orifice 4. In contrast to the exemplary rectangular profile illustrated in FIG. 1, the cross section of this ring may also be circular or have other possible geometric shapes.

The support 3 has an opening 7 for the air that comes from an air-conditioning system connected to the venting system, of which an air duct 6 is illustrated in FIG. 1. This opening 7 is embodied in such a way that it has a circumferential edge 8 that points toward the dashboard 2 and has a decreasing cross section, reference here being made to the junction in FIG. 1. The air supply orifice 4 is partially introduced into the region with the smaller cross section, the air supply orifice 4 having, in the region near to the support, a shape that is adapted to the junction and that is referred to below as a spoiler 9 so that the airflow is influenced as little as possible. The spoiler 9 is of elastic design according to the present exemplary embodiment, so that it adjusts itself satisfactorily to the edge 8 and compensates for dimensional inaccuracies. Manufacture is preferably carried out by means of two-component injection molding. Alternatively, the spoiler 9 may also be fabricated from a hard material, in particular from the same material as the other part of the wall of the air supply orifice 4. The sealing profile of the spoiler 9 can also be manufactured separately and mounted on the air supply orifice 4. Instead of an elastically formed spoiler 9, it is also possible to use a foamed spoiler that can be manufactured in one step together with the wall of the air supply orifice 4, e.g., by means of two-component injection molding.

According to one modification (not illustrated) the spoiler can also be formed on the support so that it simplifies the shape of the air supply orifice. In the process, the spoiler can be mounted as an additional part on the support, with the latter having a predetermined break point if it is fabricated from a hard material. Alternatively, it can be fabricated from a soft elastomer, in particular using two-component moulding technology.

In the event of a crash and the impacting of an object or of a head, the dashboard 2 is deformed, and the air supply orifice 4 is pushed in the longitudinal direction into the support 3. The resistance that is to be overcome in the process is relatively small. If appropriate, predetermined break points (not illustrated) that free-up the air supply orifice 4 in the direction of the support 3 in the event of a crash are provided at protrusions that are provided for positioning the air supply orifice 4 in the support 3. The maximum possible displacement distance of the air supply orifice 4 is preferably equal to or greater than the maximum anticipated deformation of the dashboard 2. As a result, injuries caused as a result of areas of the air supply orifice 4 that protrude when the dashboard 2 is deformed can be avoided.

Figure 2:
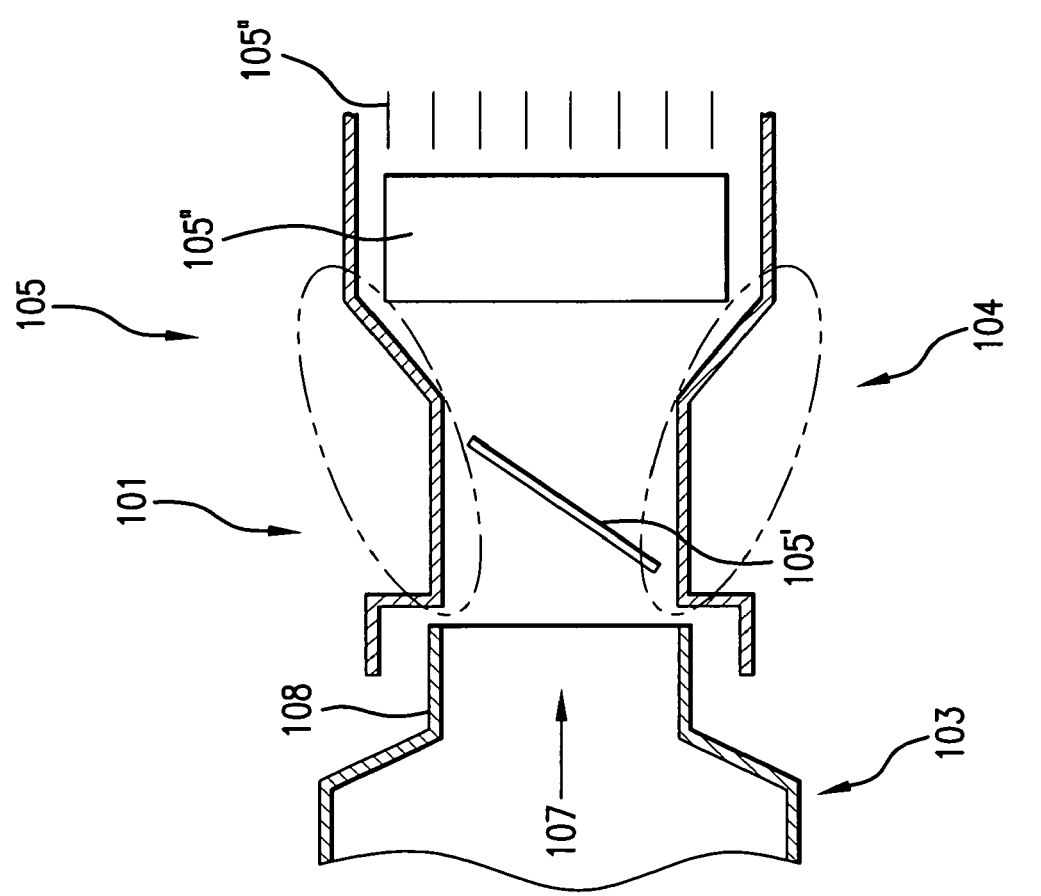
FIG. 2 is a cross-sectional view taken through an air supply orifice arrangement according to a second exemplary embodiment which is illustrated in simplified form.

According to the second exemplary embodiment illustrated in FIG. 2, identical or identically acting components or elements are provided with reference numbers that are higher by 100.

According to the second exemplary embodiment, the air supply orifice arrangement 101 is associated with a venting system and is formed in a dashboard (not illustrated in detail) by a support 103 and an air supply orifice 104 that is plugged onto the support 103. The support 103 is illustrated here in FIG. 2 only in the region of an air outlet opening.

The air supply orifice 104 is formed as one part, comprising a schematically indicated vent 105' and louvers 105" arranged in the interior of the air supply orifice that form an air guide device 105 and are used to control the air that is fed to the passenger compartment of the vehicle. Any desired configuration of louvers may be used, as in the first exemplary embodiment, as long as its movement mechanism or movement electrical system is embodied in such a way that it does not impede displacement of the air supply orifice 104 with respect to the support 103. At least one predetermined break point (not illustrated in detail here and more details of which will be given below) is provided in the region indicated by ellipses in FIG. 2.

The support 103 has an opening 107 that is embodied in such a way that it has a circumferential edge 108 that points toward the dashboard and has a decreasing cross section. The edge 108 has, at its end, a cross section that corresponds to that of the flow duct of the air supply orifice 104, as can be seen in FIG. 2. In order to secure and seal the air supply orifice 104 with respect to the support 103, an edge with a larger cross section, that is plugged over the edge 108 of the support 103, is provided on the air supply orifice 104. Additional sealing means can be arranged in this region.

The predetermined break point may extend in the longitudinal direction of the air supply orifice 104 so that in the event of a crash and an object or a head impacting against the dashboard in the region of the air supply orifice 104, the wall of the air supply orifice 104 splits in the longitudinal direction and moves toward the support 103. In order to offer as little resistance as possible, the edge 108 of the support and of the region of the air supply orifice 104 that bears against the support 103 is preferably of correspondingly rounded or beveled design.

Figure 3:
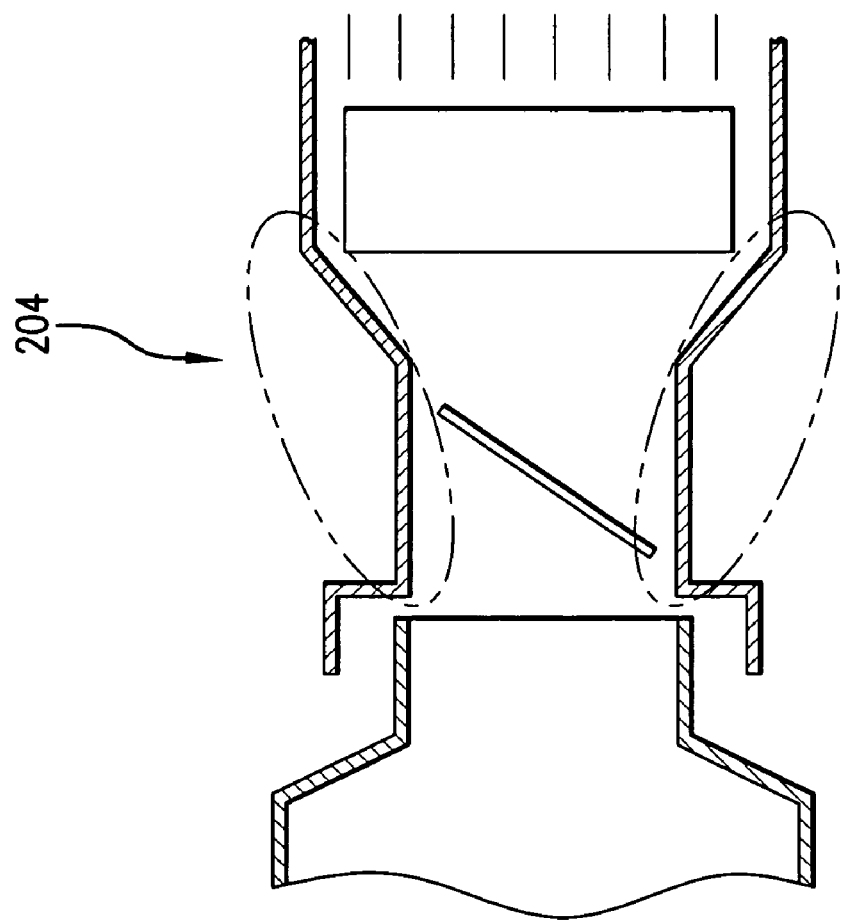
FIG. 3 is a cross-sectional view taken through an air supply orifice arrangement according to a third exemplary embodiment which is illustrated in simplified form.

FIG. 3 shows a third exemplary embodiment that corresponds essentially to the second exemplary embodiment but also includes at least one elastic region in the region indicated by the ellipses, instead of a predetermined break point. This elastic region permits a corresponding movement at least of the region of the air supply orifice 204 that is arranged on the dashboard.

Figure 4:
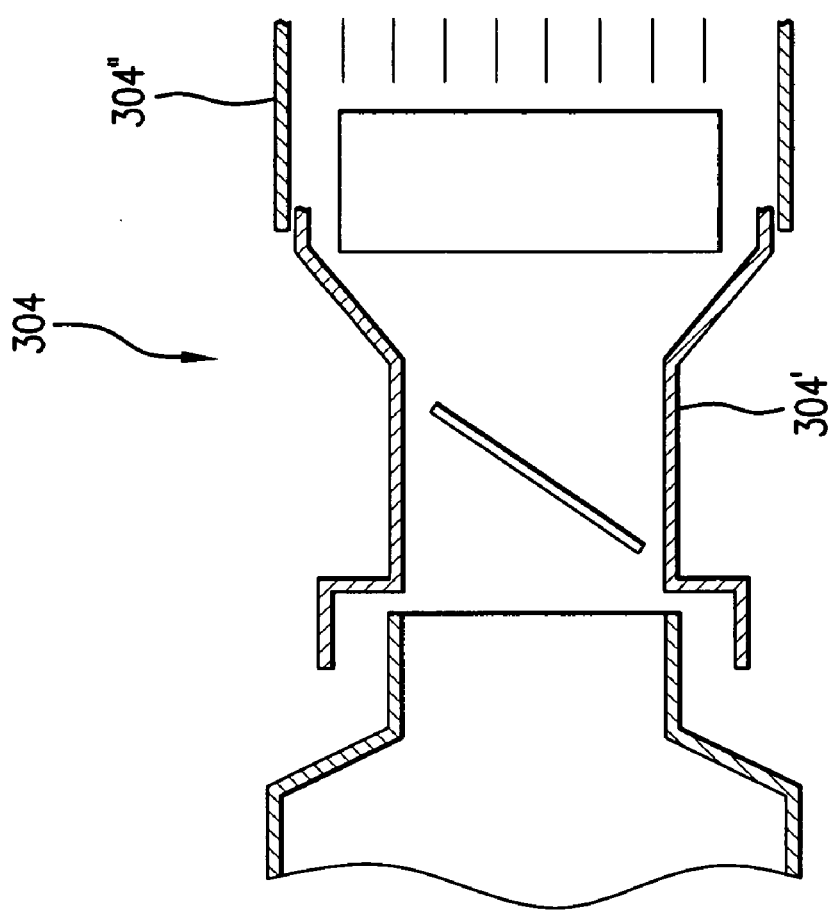
FIG. 4 is a cross-sectional view taken through an air supply orifice arrangement according to a fourth exemplary embodiment which is illustrated in simplified form.

A fourth exemplary embodiment, that shows a two-part configuration of the air supply orifice 304, is illustrated in FIG. 4. Otherwise, the fourth exemplary embodiment generally corresponds to the second exemplary embodiment illustrated in FIG. 2. Here, the bearing region of the two parts 304' and 304" of the air supply orifice 304 serves as a predetermined break point, so that a second source of longitudinal displacement of the front region of the air supply orifice 304, that is arranged in or on the dashboard, is ensured where necessary.

Figure 5:
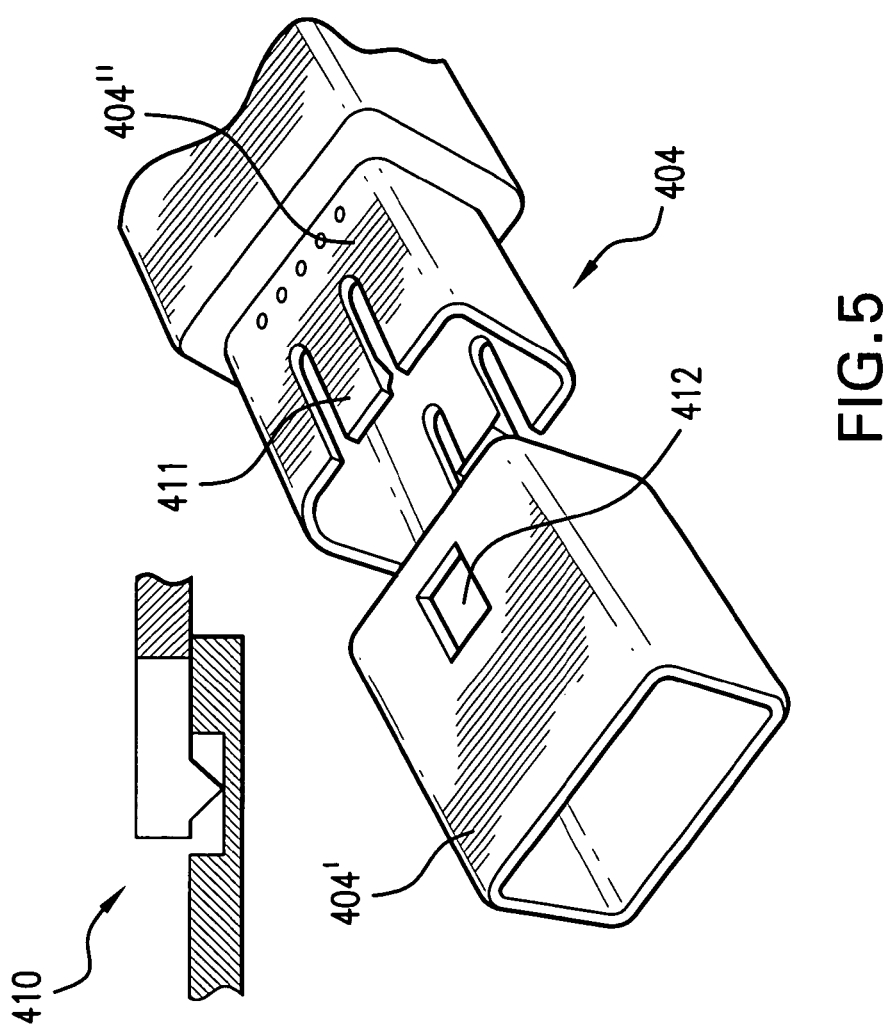
FIG. 5 is a perspective exploded view of a fifth exemplary embodiment, with a section in the longitudinal direction of a clip connection being illustrated top left.

FIG. 5 shows a fifth exemplary embodiment, in which the air supply orifice 404 is also of two-part design, specifically with a vent part 404' and a grille part 404". The latter forms the part arranged in the dashboard. Here, the vent part 404' is fixed to a support (not illustrated), for example, as illustrated in FIG. 2. The grille part 404" is plugged onto the vent part 404', with positioning being carried out by means of two clip connections 410, an upper one and a lower one being provided in the exemplified air supply orifice 404. Two spring arms 411 are formed on the grille part 404" that engage in an elastic or spring-lock fashion in depressions or openings 412 provided in the vent part 404'. In an alternative embodiment (not illustrated) the vent part 404' can be plugged onto the grille part 404". In addition, the arrangement of the attachment elements on the vent part and on the grille part can be interchanged. Furthermore, the number and arrangement of the attachment elements can vary.

During an impact, the spring force of the two spring arms 411 is easily overcome so that the grille part 404" slides over the vent part 404' without application of a relatively large force.

Figure 6B:
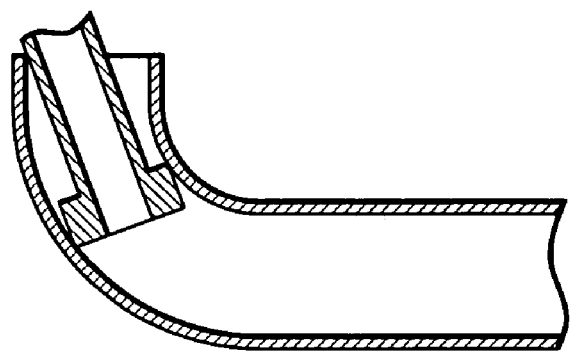
FIGS. 6A and 6B are cross-sectional views taken through a sixth exemplary embodiment, illustrated in simplified form, with FIG. 6A showing the normal position of the air supply orifice and FIG. 6B showing the position of the air supply orifice after a crash.
Figure 6A:
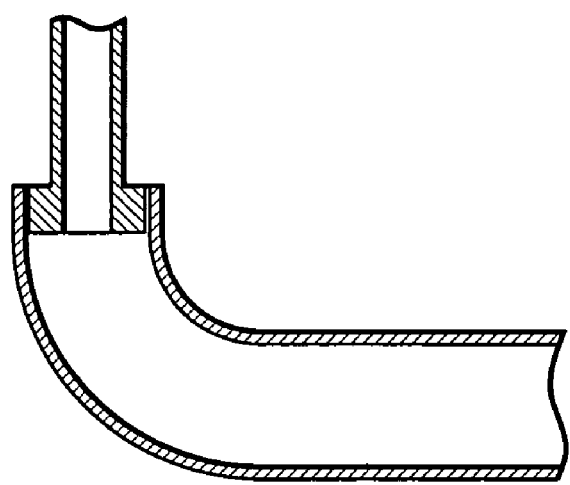

FIGS. 6A and 6B illustrate a sixth exemplary embodiment that corresponds essentially to the first exemplary embodiment, but, in the event of a crash, a pure longitudinal displacement does not occur, as is apparent in particular from FIG. 6B. Instead there is a curved movement, predominantly in the rear region. The configuration of the air supply duct is curved and carries the inserted end of the air supply orifice with the air guide portion of the air supply orifice, in the curved direction, upon a telescoping of the air supply orifice into the support structure.

Figure 7:
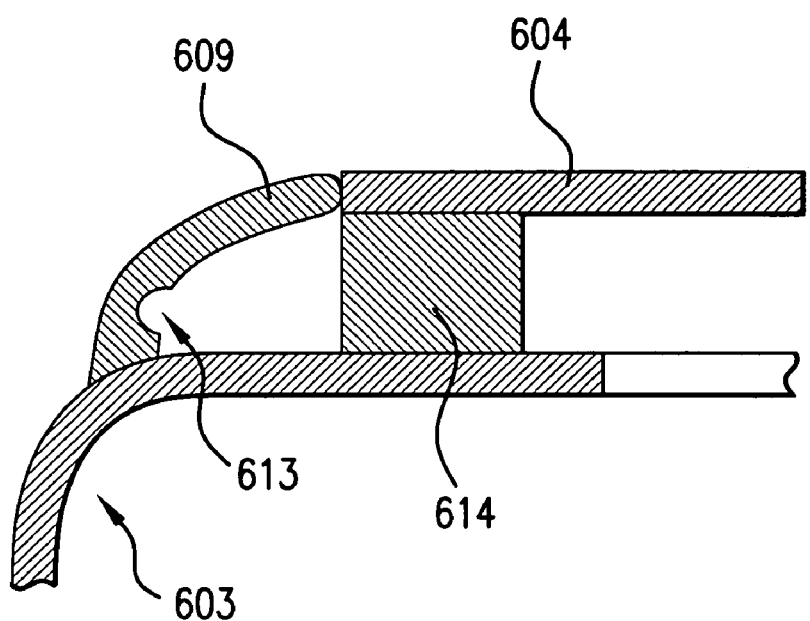
FIG. 7 is a cross-sectional view taken through a detail of a seventh exemplary embodiment.

FIG. 7 illustrates a seventh exemplary embodiment that corresponds essentially to the first exemplary embodiment, with the exception that the spoiler 609 is mounted on the support 603 provided with a circumferential predetermined break point 613 on the side pointing toward the air supply orifice 604. A sealing element 614 is provided in the intermediate space between the air supply orifice 604 and support 603.

An eighth exemplary embodiment, in which the air supply orifice 704 is embodied in two parts, is illustrated in FIGS. 8A and 8B. The dividing line of the two parts 704' and 704" extends in the longitudinal direction of the air supply orifice 704, and the two parts 704' and 704" are held together, for example, by means of clip connections 712 (not illustrated in more detail) or other types of connection. These clip connections are provided, for example, with predetermined break points (not illustrated in detail) that permit the air supply orifice 704 to be broken apart when necessary, so that it can slide further over the support 703.

Figure 9A:
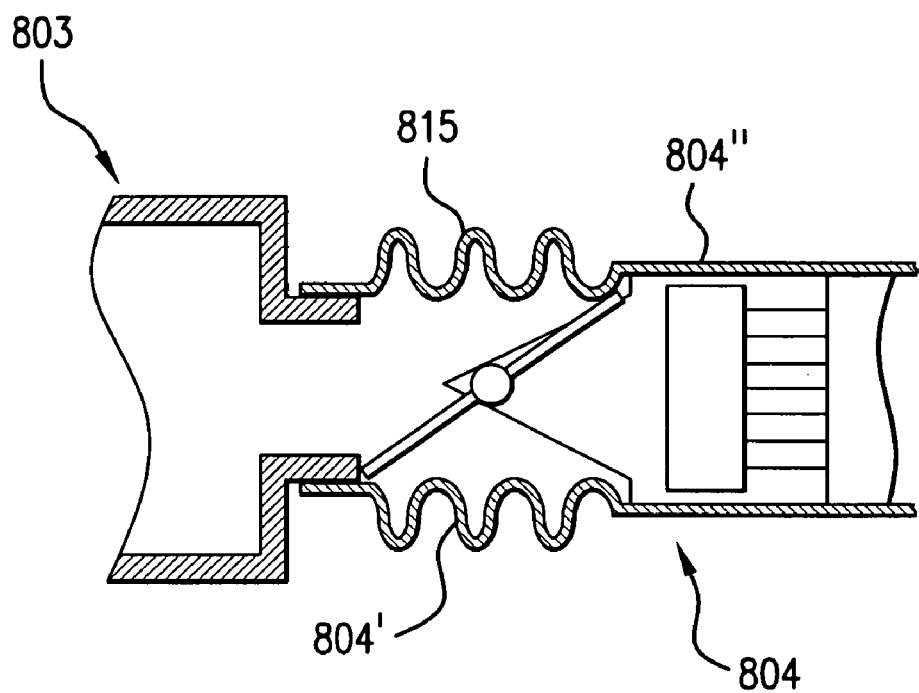
FIGS. 9A and 9B are cross-sectional views taken through a ninth exemplary embodiment, illustrated in simplified form, with FIG. 9A showing the normal position of the air supply orifice and FIG. 9B showing the position of the air supply orifice after a crash.
Figure 9B:
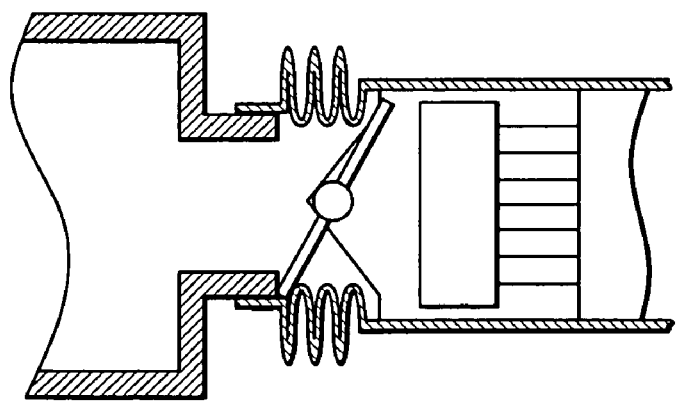

FIGS. 9A and 9B show a ninth exemplary embodiment. A part 804' of the air supply orifice 804 that is formed by a film 815, for example, is pushed over the support 803. Here, part 804' takes on a corrugated structure in the manner of bellows, that is pushed onto the support 803. The part 804' is preferably permanently connected by its other side to the second part 804" of the air supply orifice 804. It is also possible for the two parts 804' and 804" to be embodied in one piece. The second part 804" of the air supply orifice 804 is preferably secured, at its region facing away from the support 803, to the dashboard and may move together with the same in relation to the support 803 (cf. FIG. 9B) so that where necessary a relative movement between the support 803 and the air supply orifice 804 is possible. In the process, the part 804" of the air supply orifice 804 that is arranged in the dashboard moves along with it, so that the risk of injury is minimized.

Figure 10:
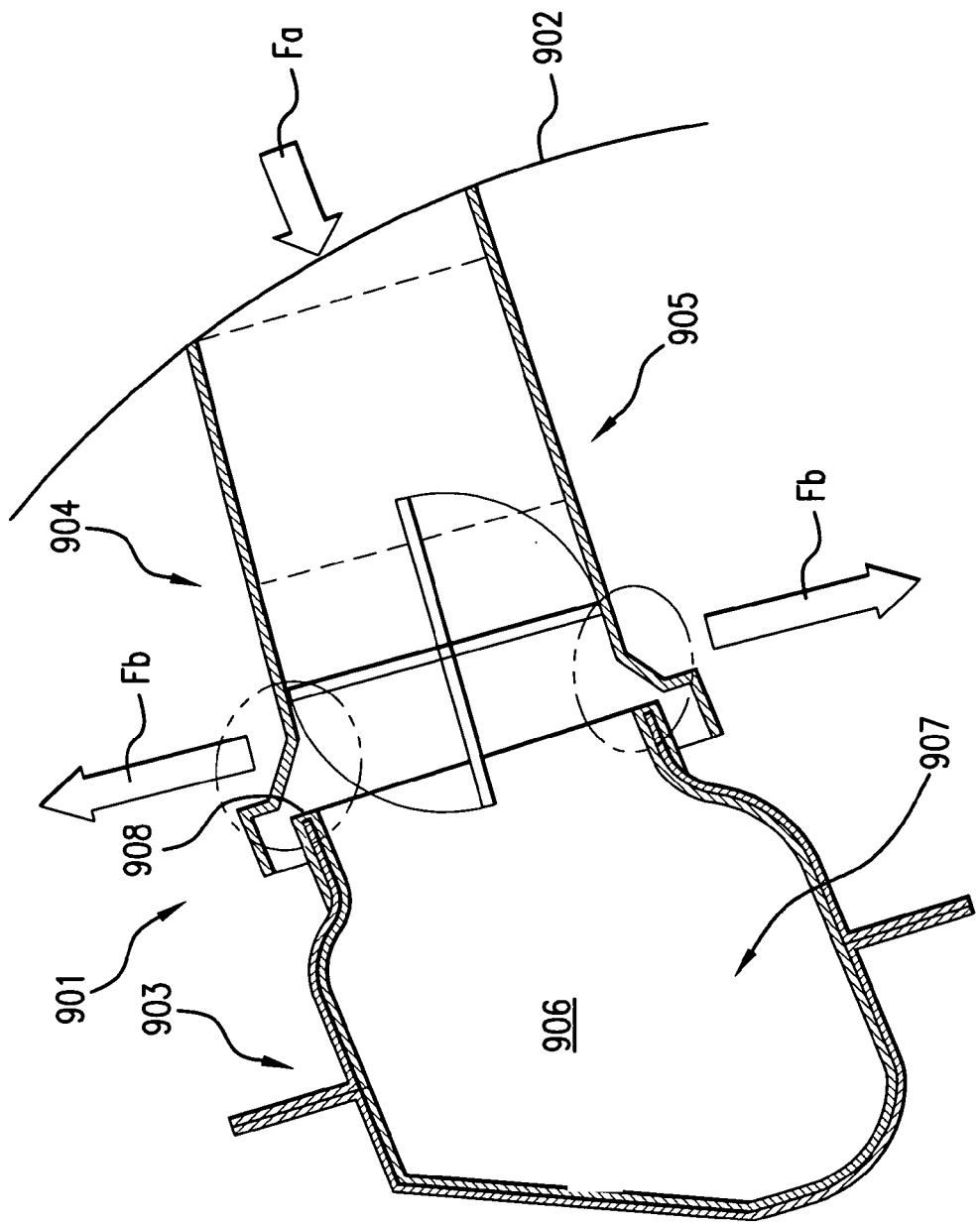
FIG. 10 is a cross-sectional view taken through an air supply orifice arrangement according to a tenth exemplary embodiment which is illustrated in simplified form.

FIG. 10 illustrates a tenth exemplary embodiment in which a support 903 has an opening 907 in order to convey or supply the air coming from an air-conditioning system connected to the venting system, which includes an air duct 906 illustrated in FIG. 10. This opening 907 has an edge 908 that points toward the dashboard.

In contrast to FIG. 1, the air supply orifice 904 is not plugged into the support 903 but rather is plugged on or fitted over it, so as to surround the edge 908 of the opening 907, or is folded over it. In the region near to the support, the air supply orifice 904 has a shape that is adapted to the junction. In the region of the plug connection, the opening 907 has approximately the same internal diameter as the air supply orifice 904, with the tubular end of the air supply orifice 904 widening conically outward in the region of the opening 907 of the support 903 and being provided with a cylindrical terminating section that can be plugged over the edge 908 of the opening 907.

A triggering force Fa, caused by an impact, is converted partially into a transverse force Fb by the conical part of the air supply orifice 904 or of the connecting bevel, resulting in an increase in the fracture load. Optionally, a spoiler (not illustrated in FIG. 10) in the junction region between the support 903 and the air supply orifice 904 can ensure that the airflow is influenced as little as possible. The spoiler may be of elastic design so that it satisfactorily fits the edge 908 and compensates for dimensional inaccuracies. Manufacture is preferably carried out by means of two-component injection molding. Alternatively, the spoiler may be fabricated from a hard material, in particular from the same material as the other part of the wall of the air supply orifice 904. The sealing profile of the spoiler can also be manufactured separately and mounted on the air supply orifice 904. Instead of an elastically embodied spoiler, it is also possible to use a foamed spoiler that can be manufactured in one step together with the wall of the air supply orifice, by means of two-component injection molding, for example.

In order to prevent sealing lips that are arranged at the end of the air supply orifice or of the support from being rolled in, the installation is preferably carried out in such a way that the air supply orifice is pushed somewhat too far into or onto the support and is then moved a small distance again toward the outside.

Alternatively, it is possible to provide sealing lips that have a corresponding profile that prevents rolling up. A spoiler of hard design can also be provided in conjunction with a sealing element, for example, made of foamed material, that is arranged downstream of it.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. An air supply orifice arrangement for supplying air into a vehicle compartment of a motor vehicle, comprising: at least one air supply orifice which is adapted to be mounted on a supporting structure associated with the vehicle and which defines an air outlet opening circumference that terminates at the vehicle compartment; and a mechanism associated at least in part with said air supply orifice for mounting the air supply orifice on the supporting structure in such a manner that the air supply orifice, including said air outlet opening circumference, can be displaced with respect to the supporting structure in response to a forward impact on the air supply orifice and wherein the mounting mechanism comprises at least one predetermined break point and/or one displacement point.

2. An air supply orifice arrangement as claimed in claim 1, wherein said mounting mechanism comprises a structure wherein the air supply orifice is inserted into the support or plugged onto it.

3. An air supply orifice arrangement as claimed in claim 1, wherein the air supply orifice can be at least partially pushed into the support in a telescoping manner.

4. An air supply orifice arrangement as claimed in claim 1, wherein said mounting mechanism comprises at least one elastic connection between the supporting structure and the air supply orifice.

5. An air supply orifice arrangement for supplying air into a vehicle compartment of a motor vehicle, comprising: at least one air supply orifice which is adapted to be mounted on a supporting structure associated with the vehicle and which defines an air outlet opening circumference that terminates at the vehicle compartment; and a mechanism associated at least in part with said air supply orifice for mounting the air supply orifice on the supporting structure in such a manner that the air supply orifice, including said air outlet opening circumference, can be displaced with respect to the supporting structure in response to a forward impact on the air supply orifice and wherein the air supply orifice comprises a plurality of parts that are connected together, wherein the connection between the individual parts of the air supply orifice is released in response to said impact.

6. An air supply orifice arrangement as claimed in claim 1, wherein the air supply orifice comprises a plurality of parts, wherein a first part is mounted on an air outlet opening in the supporting structure.

7. An air supply orifice arrangement as claimed in claim 6, further comprising an air control element located in said first part of said air supply orifice.

8. An air supply orifice arrangement as claimed in claim 6, wherein a second air supply orifice part is plugged onto said first part.

9. An air supply orifice arrangement as claimed in claim 8, further comprising at least a part of an air guide device arranged in the second air supply orifice part.

10. An air supply orifice arrangement as claimed in claim 5, wherein the individual parts of the air supply orifice are each plugged onto a region associated with the supporting structure which has a relatively smaller cross section in comparison to at least one portion of the cross section of the plugged-on part.

11. An air supply orifice arrangement as claimed in claim 1, wherein the air supply orifice arrangement forms an air duct with an essentially constant cross section, viewed in the direction of air flow.

12. An air supply orifice arrangement for supplying air into a vehicle compartment of a motor vehicle, comprising: at least one air supply orifice which is adapted to be mounted on a supporting structure associated with the vehicle and which defines an air outlet opening circumference that terminates at the vehicle compartment; and a mechanism associated at least in part with said air supply orifice for mounting the air supply orifice on the supporting structure in such a manner that the air supply orifice, including said air outlet opening circumference, can be displaced with respect to the supporting structure in response to a forward impact on the air supply orifice and wherein at least part of the air supply orifice comprises a region formed by a relatively thin-gauged material that can be axially compressed.

13. An air supply orifice arrangement as claimed in claim 1, wherein the air supply orifice arrangement can be displaced a distance of at least about 30 mm.

14. An air supply orifice arrangement as claimed in claim 13, wherein the air supply orifice arrangement can be displaced a distance of up to about 100 mm.

15. An air supply orifice arrangement as claimed in claim 1, wherein rigid components are arranged only outside a distance that the air supply orifice arrangement is capable of being displaced.

16. An air supply orifice arrangement as claimed in claim 1, further comprising at least one clip connection between the supporting structure and the air supply orifice.

17. An air supply orifice arrangement as claimed in claim 5, further comprising at least one clip connection between the two parts of the air supply orifice.

18. An air supply orifice arrangement as claimed in claim 1, wherein the air supply orifice comprises two parts and said mounting mechanism causes said parts as to be divided in the longitudinal direction in response to the impact.

19. An air supply orifice arrangement as claimed in claim 1, wherein the vehicle compartment includes a dashboard and wherein the portion of the air supply orifice that defines said air outlet opening circumference terminates at or near the surface of the dashboard facing the vehicle compartment.

20. An air supply orifice arrangement as claimed in claim 19, wherein said air outlet opening circumference is fixed to the dashboard so as to be movable with it upon deformation of the dashboard.

21. A motor vehicle comprising a vehicle compartment and an air-conditioning system supplying conditioned air to the compartment via at least one air supply duct, said air supply duct including at least one air supply orifice as defined by claim 1.

* * * * *